United States Patent [19]

Noomen et al.

[11] Patent Number: 4,990,577

[45] Date of Patent: Feb. 5, 1991

[54] LIQUID COATING COMPOSITION OF (METH)ACRYLOYL COMPOUND AND BLOCKED UNSATURATED CARBONYL COMPOUND/AMINO COMPOUND ADDUCT

[75] Inventors: Arie Noomen, Voorhout; Paul M. Vandevoorde, Sassenheim; Tamme Bartels, Tholen; Gerardus J. W. M. Maters, Bergen op Zoom; Winsenty L. S. Pilaszek, Tholen, all of Netherlands

[73] Assignee: Akzo N.V., Arnhem, Netherlands

[21] Appl. No.: 309,449

[22] Filed: Feb. 10, 1989

Related U.S. Application Data

[63] Continuation of Ser. No. 844,412, Mar. 26, 1986, abandoned.

[30] Foreign Application Priority Data

Mar. 29, 1985 [NL] Netherlands ............... 8500952

[51] Int. Cl.$^5$ ............... C08G 12/06; C08G 73/02; C08L 61/22; C08L 63/10
[52] U.S. Cl. ............... 525/454; 525/65; 525/66; 525/421; 525/449; 525/455; 525/471; 525/530; 525/531
[58] Field of Search ............... 525/471, 524, 531, 65, 525/113, 66, 421, 449, 454, 455, 530

[56] References Cited

U.S. PATENT DOCUMENTS 4,772,680  9/1988  Noomen et al. ............... 525/113

FOREIGN PATENT DOCUMENTS 0040288  11/1981  European Pat. Off. .
0049922  4/1982  European Pat. Off. .

Primary Examiner—Lewis T. Jacobs
Assistant Examiner—Robert E. L. Sellers, II
Attorney, Agent, or Firm—Louis A. Morris

[57] ABSTRACT

The invention provides a liquid coating composition curable at ambient temperature comprising a compound having at least 2 acryloyl groups or methacryloyl groups and an amino compound having a primary amino group which is blocked with an aldehyde or ketone, said amino compound being an aliphatic or cycloaliphatic amine containing 2-24 carbon atoms or an adduct of a molecular weight of 300-1500 of an epoxy compound or isocyanate compound or $\alpha,\beta$-ethylenically unsaturated carbonyl compound and a primary amine having a group reacting with said epoxy compound or isocyanate compound or $\alpha, \beta$-ethylenically unsaturated carbonyl compound. A process for coating a substrate with such composition is also provided.

10 Claims, No Drawings

LIQUID COATING COMPOSITION OF (METH)ACRYLOYL COMPOUND AND BLOCKED UNSATURATED CARBONYL COMPOUND/AMINO COMPOUND ADDUCT

This is a continuation of application Ser. No. 884,412 filed Mar. 24, 1986, now abandoned.

The invention relates to a liquid coating composition based on a compound having at least 2 acryloyl groups or methacryloyl groups and an amino compound having at least one primary amino group which is blocked with an aldehyde or ketone containing not more than 10 carbon atoms. A composition of the above type, which is curable under the influence of moisture at ambient temperature, is known from European Patent Application No. 40 288. As amino compound an amino groups-containing vinyl addition polymer is used, which as a result of the complicated and time consuming method of preparation often leads to obtaining coloured products. This is objectionable in the case of uses where the absence of colour is of essential importance, as in the case of non-pigmented toplayers in a two-layer metallics system.

The invention provides a coating composition of which the constituents are rapid and relatively simple to prepare and do not or hardly lead to coloured products.

The coating composition to the invention is characterized in that the amino compound is an aliphatic or cycloaliphatic amine containing 2–24 carbon atoms or an adduct of a molecular weight of 300–1500 of an epoxy compound or isocyanate compound or $\alpha$-$\beta$-ethylenically unsaturated carbonyl compound and an amino compound having at least 1 primary amino group and a group reacting with the epoxy compound or isocyanate compound or $\alpha,\beta$-ethylenically unsaturated carbonyl compound. It is preferred that the epoxy compound or isocyanate compound or $\alpha,\beta$-ethylenically unsaturated carbonyl compound should be divalent or polyvalent.

In the present specification, all molecular weight values may be regarded as number average molecular weight (Mn).

As representative examples of compounds having at least 2 acryloyl groups or methacryloyl groups may be mentioned the (meth)acrylic esters of di-, tri- or polyvalent polyols, including polyester polyols and polyether polyols; adducts of a hydroxyl group-containing (meth)acrylic ester of a polyol on the one hand to an at least bifunctional isocyanate compound on the other; and adducts of (meth)acrylic acid to an at least bifunctional epoxy compound. Other suitable acryloyl and methacryloyl compounds are given in the afore-mentioned European Patent Application No. 40 288, which are to be considered included here. For brevity, the compounds envisaged are referred to hereinafter as poly(-meth)acryloyl compound.

As examples of suitable (meth)acrylic esters of di-, tri- or polyvalent polyols may be mentioned the (meth)acrylic esters of ethylene glycol, propylene glycol, diethylene glycol, tetramethylene diol, neopentyl glycol, hexamethylene diol, cyclohexane diol, bis-(4-hydroxycyclohexyl) methane, glycerol, trimethylol ethane, trimethylol propane, tri(2-hydroxyethyl)isocyanurate and pentaerythritol. These esters may optionally contain a hydroxyl group. These polyols and other suitable hydroxyl compounds, such as polyester diols and polyols and polyether diols and polyols are described, among other places, in Lackkunstharze by H. Wagner and H. F. Sarx, 5$^{th}$ Ed., 1971 (Carl Hanser Verlag, München).

The hydroxyl group-containing (meth)acrylic esters on the basis of which the adduct to the at least bifunctional isocyanate compound or epoxy compound is formed are (meth)acrylic esters of polyols as also described in the afore-going. It is preferred that use should be made of acrylic esters of hydroxyl compounds having 2–6 hydroxyl groups and 2–10 carbon atoms, such as acrylic esters of dimethylol cyclohexane, ethylene glycol, hexane diol, glycerol, trimethylol propane, pentaerythritol and dipentaerythritol. More particularly, use is made of trimethylol propane diacrylate or pentaerythritol triacrylate.

As examples of at least bifunctional isocyanate compounds which may be used for the above-envisaged adduct may be mentioned aliphatic, cycloaliphatic or aromatic di-, tri- or tetraisocyanates that may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, $\omega,\omega'$-dipropylether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocylohexane, trans-vinylidene diisocyanate, dicyclohexyl methane-4,4'-diisocyanate, 3,3'-dimethyl-dicyclohexyl methane-4,4'-diisocyanate, a toluene diisocyanate, 1,3-bis(isocyanatomethyl)benzene, a xylylene diisocyanate, 1,5-dimethyl-2,4-bis-(isocyanatomethyl)benzene, 1,5-dimethyl-2,4-bis(2-isocyanatoethyl)-benzene, 1,3,5-triethyl-2,4-bis-(isocyanatomethyl)-benzene, 4,4'-diisocyanate diphenyl, 3,3'-dichloro-4,4'-diisocyanatodiphenyl, 3,3'-diphenyl-4,4'-diisocyanatodiphenyl, 3,3'-dimethoxy-4,4-diisocyanatodiphenyl, 4,4'-diisocyanatodiphenyl methane, 3,3'-dimethyl-4,4'-diisocyanatodiphenyl methane, a diisocyanatonaphthalene, the adduct of 2 molecules of a diisocyanate, for example hexamethylene diisocyanate or isophorone diisocyanate, and a diol such as ethylene glycol, the adduct of 3 molecules of hexamethylene diisocyanate and 1 molecule of water (available under the trade mark Desmodur N of Bayer), the adduct of 1 molecule of trimethylol propane and 3 molecules of toluene diisocyanate (available under the trade mark Desmodur L of Bayer), the adduct of 1 molecule of trimethylol propane and 3 molecules of isophorone diisocyanate, compounds such as 1,3,5-triisocyanatobenzene and 2,4,6-triisocyanatotoluene, and the adduct of 1 molecule of pentaerythritol and 4 molecules of toluene diisocyanate. It is preferred that use should be made of an aliphatic or cycloaliphatic di- or triisocyanate containing 8–36 carbon atoms.

As examples of the at least bifunctional solid or liquid epoxy compounds that may be used for the above-envisaged adduct may be mentioned the di-or polyglycidyl ethers of (cyclo)aliphatic or aromatic hydroxyl compounds such as ethylene glycol, glycerol, cyclohexane diol, mononuclear di- or polyvalent phenols, bisphenols, such as Bisphenol-A and Bisphenol-F, and polynuclear phenols; polyglycidyl ethers of phenol formaldehyde novolak; epoxidized and optionally, subsequently, hydrogenated styrene or divinyl benzene; glycidyl esters of fatty acids containing, for instance, 6–24 carbon atoms; glycidyl (meth)acrylate; epoxy compounds having an isocyanurate group; and epoxidized polyalkadiene such as epoxidized polybutadiene; hydantoin-epoxy resins; epoxy resins obtained by epoxidizing aliphatic and/or cycloaliphatic alkenes, such as dipentene dioxide, dicyclopentadiene dioxide and vinyl cyclohexene dioxide and glycidyl groups-containing resins such as polyesters or polyurethanes containing one or more glycidyl groups per molecule, or mixtures of the above-envisaged epoxy resins. The epoxy resins are known to a man skilled in the art and need not be further described here. It is preferred that use should be made of a cycloaliphatic epoxy compound or a polymer of ethylenically unsaturated compounds containing epoxy groups, such as glycidyl (meth)acrylate, N-glycidyl (meth)acrylamide and/or allyl glycidyl ether, and optionally one or more other copolymerizable, ethylenically unsaturated monomers. These (co)polymers may be prepared by radical polymerization using UV light and/or peroxides or azo-containing initiators such as hydrogen peroxide, cumene hydroperoxide, ditert. butyl peroxide, benzoyl peroxide, tert. butyl perbenzoate, tert. butyl pertrimethyl hexanoate, azobisisobutyronitrile and azobisvaleronitrile. In the addition of (meth)acrylic acid to an epoxy compound use may optionally be made of catalysts and/or polymerization inhibitors. As examples of suitable catalysts may be mentioned triethylamine, pyridine, quaternary ammonium salts, triaryl phosphines and chromium (III) salts. Examples of suitable polymerization inhibitors include benzoquinone, hydroquinone, p-methoxyphenol and methylene blue. By preference the poly(meth)acryloyl compound is the adduct of an at least bifunctional isocyanate compound and a hydroxyfunctional acrylic ester of a hydroxyl compound containing 2-6 hydroxyl groups and 2-10 carbon atoms or the adduct of an at least bifunctional epoxy compound and an $\alpha,\beta$-ethylenically unsaturated carboxylic acid. The poly(meth)acryloyl compound generally has a molecular weight of about 290-15000, preferably 800-10000.

As examples of representative amino compounds which according to the invention may be used in aldiminated or ketiminated form as second component of the composition may be mentioned aliphatic or cycloaliphatic amines having at least one, preferably 2 to 4, primary amino groups and 2-24 carbon atoms and a molecular weight not higher than 580. It is preferred that these amines should have 0-4 secondary amino groups. Examples of suitable amino compounds include ethylenediamine, propylenediamine, ethanolamine, propanolamine, butylenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'-diaminodicyclohexyl methane, isophoronediamine, bis-(3-methyl-4-aminocyclohexyl)methane, 2,2-bis-(4-aminocyclohexyl)propane, nitrile tris(ethane amine), polyether polyamines, for instance those that are known under the trade mark Jeffamine of Jefferson Chemical Company, bis-(3-aminopropyl) methylamine, 3-amino-1-(methylamino)-propane, 3-amino-1-(cyclohexylamino)propane, N-(2-hydroxyethyl)ethylene diamine and polyamines of the formula $H_2N-(R_2-NH)_n-R_1-NH_2$, wherein the group $R_1$ and the n groups $R_2$ may be the same or different and represent an alkylene group containing 2-6, and preferably 2-4 carbon atoms and n is a number from 1-6 and preferably 1-3. By an alkylene group is also to be understood here a cycloalkylene group or an alkylene group containing an ether-oxygen atom. Examples of representative polyalkylene polyamines include diethylene triamine, dipropylene triamine and dibutylene triamine. Other suitable amino compounds are adducts of a polyamine or a hydroxylamine to a monoepoxy compound, a monoisocyanate or a monofunctional $\alpha,\beta$-ethylenically unsaturated carbonyl compound. It is preferred that the amino compound should be of a cycloaliphatic nature and contain 5-15 carbon atoms, such as isophorone diamine, 4,4'-dicyclohexylmethanediamine and 3,3'-dimethyl-4,4'-dicyclohexylmethanediamine.

Other suitable amino compounds which are to be preferred according to the invention are adducts of a molecular weight of 300-1500 of a di- or polyvalent epoxy or isocyanate compound or $\alpha,\beta$-ethylenically unsaturated carbonyl compound and an amino compound containing at least 1 primary amino group and a group reacting with the di- or polyvalent compound. The polyfunctional compounds referred to here may be identical with those mentioned hereinbefore as starting compounds for the poly(meth)acryloyl compound. But there is of course no need for the same polyfunctional compound to be used as starting compound for both the poly(meth)acryloyl compound and the amino compound. As to those polyfunctional compounds, reference is made to that mentioned hereinbefore. The $\alpha,\beta$-ethylenically unsaturated compound to be used with the amino compound in the formation of the adduct is preferably a poly(meth)acryloyl compound mentioned hereinbefore; alternatively, use may be made of a compound having one or more $\alpha,\beta$-ethylenically unsaturated dicarboxylic acid units, such as maleic acid or fumaric acid or an ester thereof. The polyfunctional compounds referred to here should, of course, be so chosen that the adduct formed from it along with the amino compound has the molecular weight of 300-1500 required according to the invention.

The amino compounds that are used in the formation of the adduct thereof to the polyfunctional epoxy compound or isocyanate compound or $\alpha,\beta$-ethylenically unsaturated carbonyl compound may preferably be the afore-mentioned amino compounds containing 2-24 carbon atoms or, optionally, monoamines, preferably primary monoamines which have a group, for instance a hydroxyl group or mercaptan group, reacting with an epoxy compound or isocyanate compound or an $\alpha,\beta$-ethylenically unsaturated carbonyl compound. It is preferred that the amino compound should be an adduct of a polyamine of the formula $H_2N-(R_2-NH)_n-R_1-NH_2$, wherein the group $R_1$ and the n groups $R_2$ may be the same or different and represent an alkylene group having 2-6, more particularly 2-4 carbon atoms and n is a number from 1-6, more particularly 1-3, to a divalent or polyvalent epoxy compound or isocyanate compound or $\alpha,\beta$-ethylenically unsaturated carbonyl compound.

For use in the coating composition according to the invention the amino groups of the afore described amino compounds are blocked with an aldehyde or ketone containing not more than 10 carbon atoms, preferably 3-8 carbon atoms. Example of suitable blocking agents for the amino groups include acetone, methylethyl ketone, diethyl ketone, methylisopropyl ketone, methylisobutyl ketone, isobutyraldehyde, 2-pentanone, cyclohexanone, ethylamyl ketone, diisobutyl ketone, 3-octanone and decanone. It is preferred that use should be made of an aliphatic or cycloaliphatic ketone, more particularly containing 3-8 carbon atoms.

An effective method of preparing the above-mentioned adducts is, for example, the addition reaction of the epoxy or isocyanate compound or the $\alpha,\beta$-ethylenically unsaturated carbonyl compound referred to before and an amino-, hydroxyl- or mercaptan-functional ketimine or aldimine. Optionally, the amino group(s) may be blocked after the addition reaction. The blocking of amino groups is known per se and need not be further described here.

In the coating composition according to the invention the poly(meth)acryloyl compound and the blocked amino compound are usually present in amounts such that the ratio of the number of equivalents of ethylenically unsaturated double bonds to the number of equivalents of amine-hydrogen is in the range of 0.3 to 3.0 preferably of ½ to 2.

The composition generally contains an organic solvent which is commonly applied for instance in the industrial preparation of paint, such as aliphatic or aromatic hydrocarbons, esters, ethers, alcohols, ketones and ether acetates.

The coating composition may further contain the usual additives, such as pigments; fillers, levelling agents, for instance acrylate oligomers; anti-foaming agents, for instance silicone oil; rheology control agents, for instance bentonites, hydrogenated castor oil derivatives and adducts of a di- or triisocyanate and a monoamine or diamine; catalysts such as sulphuric acid phosphoric acid, sulphonic esters, phosponic esters, phosphoric esters, and carboxylic acids; antioxidants, such as substituted phenols; reducing agents, such as trialkyl phosphites, trialkyl phosphines, Cu (I) salts, borium hydrides, aluminium hydrides, nitriles, sulphites and metal complexing compounds such as polycarboxylic acids and dialkyl ketoximes; UV stabilizers, such as benzophenones, triazoles, triazines, benzoates and hindered bipiperidylamines and sag control agents, such as soyalecithin and pyrolized silica. Optionally, the composition may contain one or more compounds, such as an acrylate (co)polymer, cellulose acetopropionate, cellulose acetobutyrate, nitrocellulose, a vinyl polymer, an epoxy resin or an acetoacetate group-containing compound.

The coating composition may be applied to the substrate in any suitable manner, such as by roller coating, spraying, brushing, sprinkling, flow coating, or dipping. It is preferred that the composition should be applied by spraying.

Suitable substrates include those of pretreated or non-pretreated metals, such as iron, steel, galvanized steel and aluminium, and wood, synthetic materials, paper or leather. Curing the applied coating may be carried out very conveniently at a temperature of, say, 0°-30° C. Optionally, a curing temperature higher than 30° C. may be used, so that the curing time can be reduced. If desired, the composition may also be baked, for instance at a temperature in the range of 60° to 120° C.

The invention will be further described in the following examples, which are not be construed as limiting the scope of the present invention. By "parts" is to be understood "parts by weight" and by "%" percentage by weight. The viscosity was determined at 20° C., unless otherwise indicated. All (meth)acryloyl compounds A-F and blocked amino compounds A-F had an initial colour number lower than 2 in accordance with Gardner.

Preparation of (meth)acryloyl compounds (Meth)acryloyl compound A

Into a reactor were charged 107.5 g of cumene hydroperoxide and 3445 of xylene. The mixture was heated to boiling temperature, followed by adding over a period of 90 minutes 1560 g of glycidyl methacrylate, 2807 g of styrene and 1872 g of butyl acrylate. The reaction mixture was kept at boiling temperature until a conversion of more 98% had been obtained. Then 195 g of xylene were added. Subsequently, 4252 g of the previously prepared polymer, 320.4 g of acrylic acid, 2.7 g of chromium (III)-2-ethylhexanoate and 4.57 g of hydroquinone were intermixed and, with air being passed through, kept at a temperature of 110° C. until the acid number of the mixture had decreased to below 2. Next, 150 g of xylene were added. A 53.1%- solution of the (meth)acryloyl compound A was obtained having an acid number of 0.9 and a viscosity of 170 cPa.s.

(Meth)acryloyl compound B

Into a reactor were charged 2400 g of xylene, which were heated to boiling temperature. Subsequently, 2160 g of glycidyl methacrylate, 2112 g of styrene, 528 g of butyl acrylate and 192 g of tert.butyl perbenzoate were added over a period of 3 hours. The reaction mixture was kept at boiling temperature until a conversion of more than 98% had been attained. Then 258.6 g of xylene were added. Next, 3183 g of the previously prepared copolymer 430 g of acrylic acid, 2.15 g of chromium (III)-2-ethylhexanoate and 3.55 g of hydroquinone were intermixed and, with air being passed through, kept at a temperature of 110° C. until the acid number of the mixture had decreased to below 4. Next, 630 g of xylene were added. A 55.0%-solution of the (meth)acryloyl compound B was obtained having an acid number of 3.9 and a viscosity of 176 cPa.s.

(Meth)acryloyl compound C

Into a reactor were charged 1200 g of xylene, which were heated to boiling temperature. Subsequently, 600 g of glycidyl methacrylate, 1476 g of styrene, 324 g of butyl acrylate and 40.8 g of tert.butyl perbenzoate were added over a period of 3 hours. The reaction mixture was kept at boiling temperature until a conversion of more than 98% had been obtained. Next, 108 g of xylene were added. Then 3201 g of the previously prepared copolymer, 235 g of acrylic acid, 0.59 g of chromium (III)-2-ethylhexanoate and 3.4 g of hydroquinone were intermixed and, with air being passed through, kept at a temperature of 110° C. until the acid number of the mixture had decreased to below 2. Next, 382 g of xylene and 171 g of n-butanol were added. A 57.0%-solution of the (meth)acryloyl compound C was obtained having an acid number of 0.8 and a viscosity of 186 cPa.s.

(Meth)acryloyl compound D

Into a reactor were charged 310.2 g of isophorone diisocyanate and a few drops of dibutyltin dilaurate, followed by heating to a temperature of 65°-70° C. Into the reactor was subsequently charged over a period of 30 minutes a mixture of 720 g of trimethylol propane diacrylate and 550 ppm of hydroquinone, with air being passed through the mixture. The reaction mixture was kept at a temperature of 70° C. until the isocyanate content had decreased to below 0.1%. Then methylisobutyl ketone was added in an amount such that a 90%-solution of the (meth)acryloyl compound D was obtained; the acid number was 1.7 and the viscosity 62 cPa.s.

(Meth)acryloyl compound E

Into a reactor there were successively charged 600 g of pentaerythritol triacrylate, 150 g of hexamethylene diisocyanate, 250 g of butyl acetate, 0.38 g of hydroquinone and a few drops of dibutyltin dilaurate, followed by heating to a temperature of 55°-60° C., with air being passed through the mixture. The reaction mixture was kept at a temperature of 60° C. until the isocyanate content was less than 0.1%. A 75.0%-solution of the (meth)acryloyl compound E was obtained having an acid number of 1.1 and a viscosity of 140 cPa.s.

(Meth)acryloyl compound F

Into a reactor were charged 600 g of pentaerythritol triacrylate and 292.6 g of hexahydrophthalic acid, which were heated to a temperature of 90°-100° C., with air being passed through, until the mixture had an acid number of 120. Subsequently, 473 g of a diglycidyl ether of hydrogenated Bisphenol-A (available under the trade mark Eponex 1511 of Shell Chemical), 0.71 g of chromium (III)-2-ethyl-hexanoate and 0.68 g of hydroquinone were successively added to the reaction mixture and heated to a temperature of 130° C. Next, the reaction mixture was kept at said temperature until the acid number had dropped to 5, after which methylisobutyl ketone was added in an amount such that an 85%-solution of the (meth)acryloyl compound F was obtained. This solution had an acid number of 0.3 and a viscosity of 20.0 Pa.s.

Preparation of blocked amino compounds

Blocked amino compound A

Into a reactor were successively charged, under an atmosphere of nitrogen, 196.5 g of dipropylene triamine, 330 g of methylisobutyl ketone, 131.6 g of toluene and 2.0 g of formic acid, the resulting mixture being heated to boiling temperature and the reaction water evolved being removed by azeotropic distillation. After 20 hours 53.9 g of water (obtained in 99.8% of the theoretical yield) were collected. The resulting solution was cooled to 60° C., after which over a period of 2 hours a solution of 297.7 g of a diglycidyl ether of Bisphenol A (available under the trade mark Epikote 828 of Shell Chemical) in 446.5 g of toluene was added. This reaction mixture was kept at a temperature of 60° C. over a period of 4 hours. The resulting solution of the blocked amino compound A was cooled, after which it was stored without being purified.

Blocked amino compound B

Into a reactor there were successively charged under an atmosphere of nitrogen 348.6 g of 1,2-di(3-aminopropylamino)-ethane, 660 g of methylisobutyl ketone, 336 g of toluene and 3.5 g of formic acid, followed by heating to boiling temperature, the reaction water evolved being removed by azeotropic distillation. After 6 hours 73.9 g of water (obtained in 100% of the theoretical yield) were collected. The resulting solution wa cooled to 65° C., followed by adding to it over a period of 2 hours 124.3 g of 3,4-epoxycyclohexylmethyl-3,4-epoxycyclohexane carboxylate. This reaction mixture was kept at a temperature of 65° C. for 4 hours. The resulting solution of the blocked amino compound B was cooled, after which it was stored without being purified.

Blocked amino compound C

Into a reactor there were successively charged under an atmosphere of nitrogen 225.4 g of dipropylene triamine, 429 g of methylisobutyl ketone, 228.2 g of toluene and 2.5 g of formic acid, followed by heating to boiling temperature, the reaction water evolved being removed by azeotropic distillation. After 5 hours 70.1 g of water (obtained in 99.9% of the theoretical yield) were collected. The resulting solution was cooled to 40° C., after which 226 g of hexane diol diacrylate were added over a period of 3 hours. This reaction mixture was kept at a temperature of 70° C. for 2 hours. The resulting solution of the blocked amino compound C was cooled, after which it was stored without being purified.

Blocked amino compound D

Into a reactor there were successively charged under an atmosphere of nitrogen 1632.4 g of isophorone diamine, 800 g of methylisobutyl ketone, 720.8 g of toluene and 27.2 g of a silica-alumina catalyst, followed by heating to boiling temperature, the reaction water evolved being removed by azeotropic distillation. After 4 hours 144 g of water (obtained in 100% of the theoretical yield) were collected. The resulting solution was cooled to 60° C., after which 790.4 g of trimethylol propane triacrylate were added over a period of 1 hour. This reaction mixture was kept at a temperature of 75° C. for 3 hours. The resulting solution of the blocked amino compound D was cooled, after which it was stored without being purified.

Blocked amino compound E

Into a reactor there were successively charged under an atmosphere of nitrogen 580 g of 1,6-diaminohexane, 434 g of toluene and 434 g of n-butanol, followed by heating to a temperature of 80° C. Subsequently, 288 g of dimethyl maleinate were added over a period of 2 hours. After the reaction mixture had been kept at a temperature of 80° C. for 1 hours, the mixture was heated to boiling temperature and methanol was removed by azeotropic distillation. After 4 hours the theoretical amount of methanol was collected. The resulting solution was cooled to 80° C., followed by adding 440 g of methylisobutyl ketone. This reaction mixture was then heated to boiling temperature, the water formed being removed by azeotropic distillation. After 3 hours 72 g of water were collected (obtained in 100% of the theoretical yield). The resulting solution of the blocked amino compound F was cooled, after which it was stored without being purified.

Blocked amino compound F

Into a reactor there were successively charged 1332 g of isophorone diisocyanate and 0.6 g of dibutyltin dilaurate, followed by heating to a temperature of 40° C. Subsequently, there was added a solution of 354 g of hexane-1,6-diol in 531 g of methylisobutyl ketone. After one hour the product obtained had an isocyanate content of 11.5%.

In a separate reaction cycle there were successively charged into a reactor 707.5 g of dipropylene triamine, 1188 g of methylisobutyl ketone, 632 g of toluene and 14.1 g of a silica-alumina catalyst, followed by heating to boiling temperature, the reaction water evolved being removed by azeotropic distillation. After 7 hours 193.6 g of water (obtained in 99.6% of the theoretical yield) were collected. The resulting solution was cooled to 60° C., after which over a period of 2 hours 2217 g of the aforementioned, separately prepared isocyanate group-containing adduct was added. This reaction mixture was kept at a temperature of 60° C., after which 606 g of n-butanol were added. Finally, the resulting solution of the blocked amino compound F was cooled, filtered and stored.

EXAMPLES 1-13

200 parts by weight of a coating composition were prepared by intermixing stoichiometric amounts of the (meth)acryloyl compounds and blocked amino compounds given in Table 1. The blocked amino compounds G-M given in Table 1 are, respectively, the methylisobutyl ketimine of isophorone diamine (G), the cyclohexanone ketimine of ethylene diamine (H), the cyclohexanone ketimine of nitril-tris (ethane amine) (K), the methylisobutyl ketimine of 3,3'-dimethyl-4,4'diamino-dicyclohexyl methane (L) and the isobutyraldimine of isophorone diamine (M). The processing time of these compositions (measured at 20° C. and expressed in hours) is also given in Table 1. Subsequently, the compositions were applied to a steel panel (Bonder No. 120) to a coating thickness of 40 μm (after drying). The coatings obtained were tack-free, and so cured that after the time given in Table 1 no visible thumb marks were left (thumb resistant). The Persoz hardness of the coatings was determined after respectively 1 and 7 days' drying at 20° C. The resistance of the coating to premium grade petrol and methylethyl ketone (MEK) was determined after 1 week's drying by placing on the panel a small wad of cottonwool soaked with the respective solvent, followed by scratching the coating with a pencil of 2 B hardness. If damage becomes visible only after at least 5 minutes' or 3 minutes' contact with premium grade petrol, the resistance is rated excellent or moderate. For methylethyl ketone the ratings are, respectively,: excellent, good, fairly good and moderate, when the damage becomes visible after 60, 45, 30 and 15 seconds, respectively.

We claim.
1. A liquid coating composition based on
(A) a compound having at least two acryloyl groups or methacryloyl groups, and
(B) an amino compound having at least one primary amino group which is blocked with an aldehyde or ketone containing not more than 10 carbon atoms, characterized in that the amino compound comprises an adduct of number average molecular weight 300-1500 of:
  (1) an α,β-ethylenically unsaturated carbonyl compound, and
  (2) an amino compound having
    ( i) at least one primary amino group, and
    (ii) an amino, hydroxyl or mercaptan group reacting by addition to the α,β-ethylenically unsaturated carbonyl compound;
wherein (A) and (B) are present in an amount such that the ratio of the number of equivalents of ethylenically unsaturated double bonds to the number of equivalents of amino-hydrogen is in the range of from 0.3 to 3.0.

2. A coating composition according to claim 1, characterized in that the compound having at least 2 acryloyl groups or methacryloyl groups is the adduct of an at least bifunctional-isocyanate compound and a hydroxy functional acrylic ester of a hydroxyl compound having 2-6 hydroxyl groups and 2-10 carbon atoms or the adduct of an at least bifunctional epoxy compound and an α,β-ethylenically unsaturated carboxylic acid.

3. A coating composition according to claim 1, characterized in that the compound having at least 2 acryloyl groups or methacryloyl groups has a number average molecular weight of 290 to 15000.

4. A coating composition according to claim 1, characterized in that the amino compound is blocked with an aliphatic or cycloaliphatic ketone having 3-8 carbon atoms.

5. A coating composition according to claim 1, characterized in that the α,β-ethylenically unsaturated compound is divalent or polyvalent.

6. A coating composition according to claim 1, characterized in that the amino compound is an adduct of a polyamine of the formula H$_2$N—(R$_2$—NH)$_n$—R$_1$—NH$_2$, wherein the group R$_1$ and the n groups R$_2$ may be the same or different and represent an alkylene group having 2-6 carbon atoms and n is a number from 1-6, to the α,β-ethylenically unsaturated carbonyl compound.

7. A coating composition according to claim 6, characterized in that the amino compound is an adduct of a polyamine of the formula H$_2$N—(R$_2$—NH)$_n$—R$_1$—NH$_2$, wherein the group R$_1$ and the n groups R$_2$ may be the same or different and represent an alkylene group

| Example | (Meth)acryloyl compound | Blocked amino compound | Processing time (hours) | Tack-free after (hours) | Thumb resistant after hours | Persoz-hardness in sec. after | | Resistance to | |
|---|---|---|---|---|---|---|---|---|---|
| | | | | | | 1 day | 1 week | premium grade | MEK |
| 1 | A | A | 2 | ⅓ | 2 | 104 | 213 | excellent | fairly good |
| 2 | A | B | 0.5 | ⅓ | 2 | 98 | 189 | excellent | good |
| 3 | A | C | 1 | ⅓ | 2 | 67 | 170 | excellent | moderate |
| 4 | A | D | 3 | ⅓ | 3 | 40 | 133 | moderate | moderate |
| 5 | C | E | 2 | ⅓ | 2 | 69 | 195 | excellent | moderate |
| 6 | C | F | 3 | ⅓ | 2 | 98 | 239 | excellent | moderate |
| 7 | E | G | 5.5 | 1 | 4 | 46 | 106 | excellent | excellent |
| 8 | E | H | 2.3 | ¾ | 2.2 | 35 | 83 | excellent | excellent |
| 9 | D | G | 6 | 1 | 3 | 35 | 83 | excellent | fairly |
| 10 | F | G | 4 | ⅓ | 2 | 44 | 78 | excellent | good |
| 11 | B | K | 1 | ⅓ | ⅓ | 144 | 304 | excellent | excellent |
| 12 | B | L | >24 | 2 | 18 | 35 | 137 | moderate | moderate |
| 13 | B | M | >8 | 2 | 6 | 54 | 158 | moderate | moderate | having 2-4 carbon atoms and n is a number from 1-3, to the α,β-ethylenically unsaturated carbonyl compound.

8. A coating composition according to claim 1, characterized in that the α,β-ethylenically unsaturated carbonyl compound is selected from the group consisting of
  (a) a compound having at least two acryloyl or methacryloyl groups, and
  (b) a compound having one or more α,β-ethylenically unsaturated dicarboxylic acid units.

9. A coating composition according to claim 3, characterized in that the at least bifunctional epoxy compound is a cycloaliphatic epoxy compound, or a polymer of ethylenically unsaturated compounds having epoxy groups.

10. A coating composition according to claim 9, characterized in that the at least bifunctional epoxy compound is a cycloaliphatic epoxy compound, or a polymer of ethylenically unsaturated compounds having epoxy groups and of one or more other copolymerizable ethylenically unsaturated compounds.

* * * * *